Jan. 10, 1967  J. ADAMSKI  3,297,357
CONVERTIBLE TOP MECHANISM
Filed May 28, 1965  10 Sheets-Sheet 1

INVENTOR
JOSEPH ADAMSKI

BY *Stowell & Stowell*
ATTORNEYS

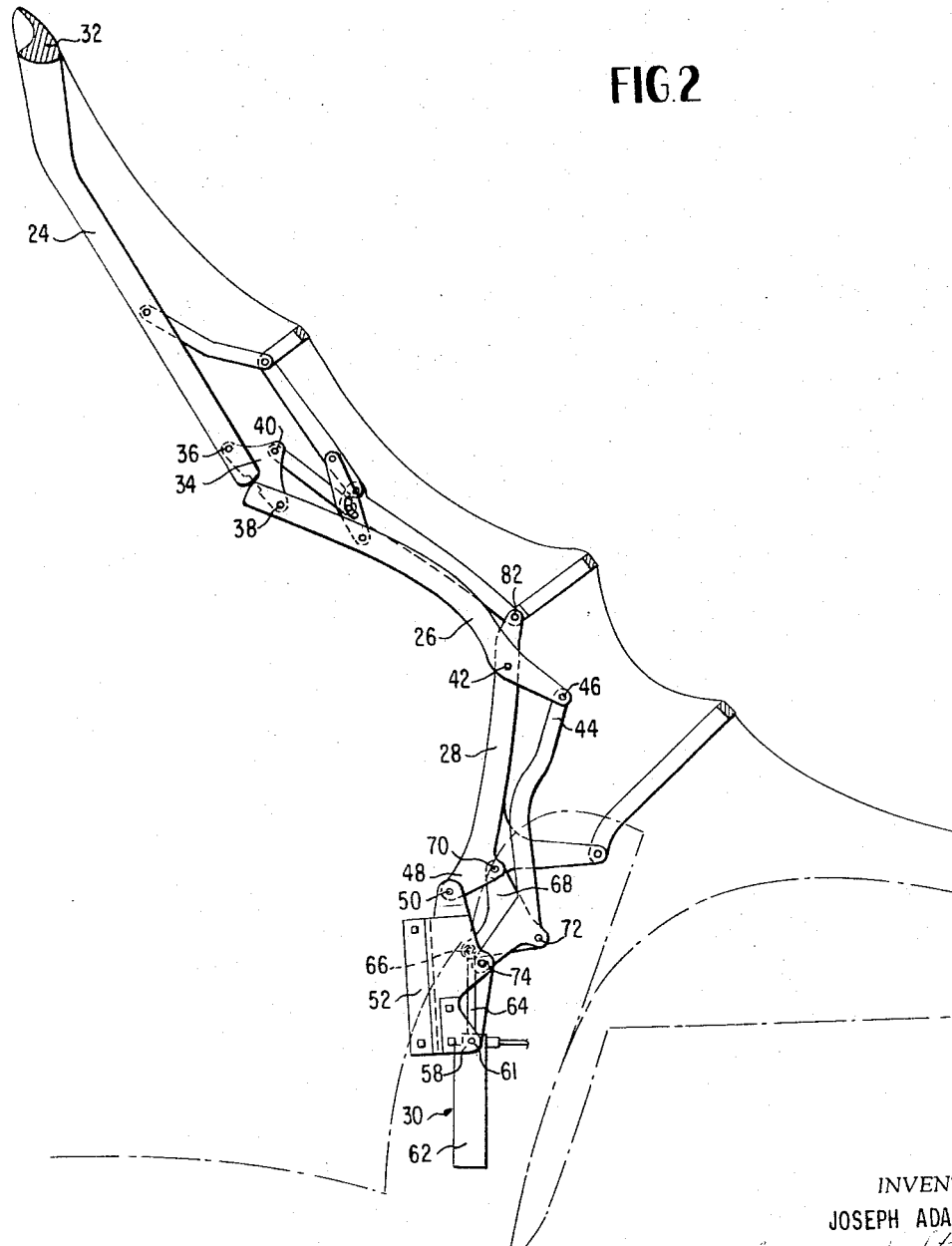

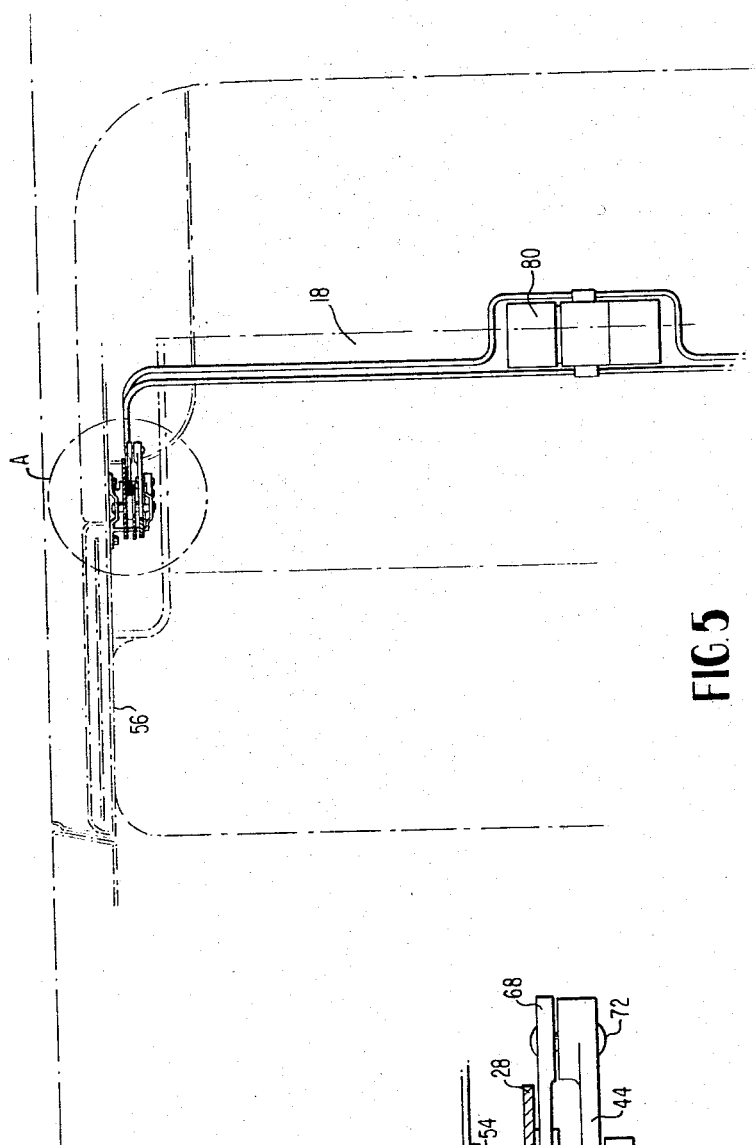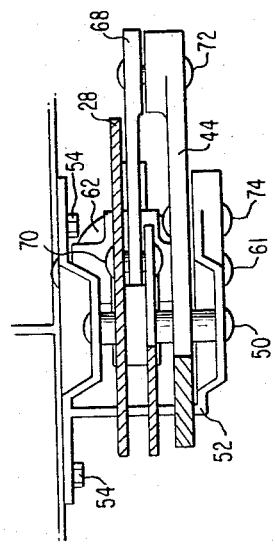

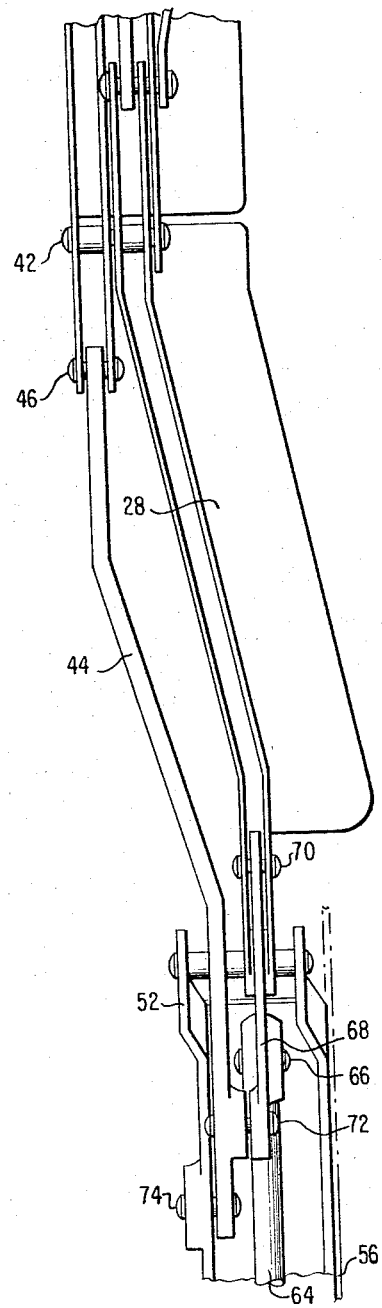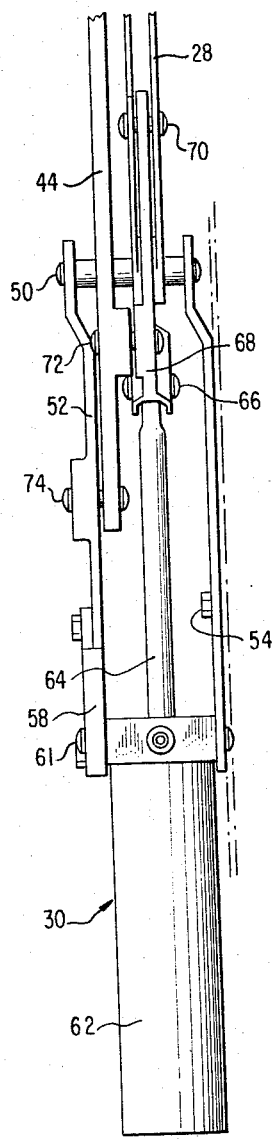

Jan. 10, 1967  J. ADAMSKI  3,297,357
CONVERTIBLE TOP MECHANISM
Filed May 28, 1965   10 Sheets-Sheet 6

INVENTOR
JOSEPH ADAMSKI

BY *Stowell & Stowell*
ATTORNEYS

INVENTOR
JOSEPH ADAMSKI

BY *Stowell & Stowell*
ATTORNEYS

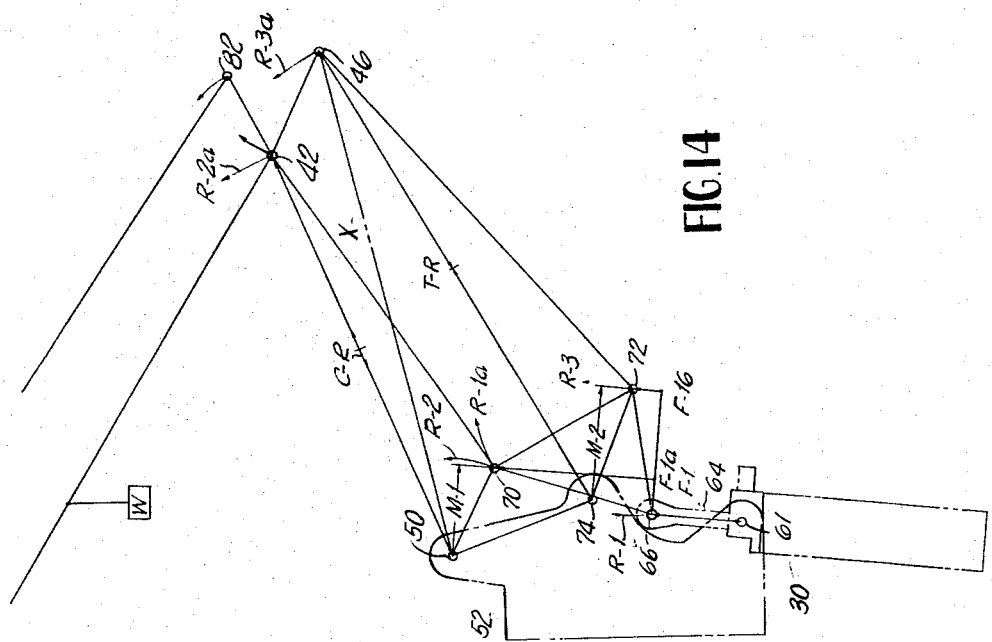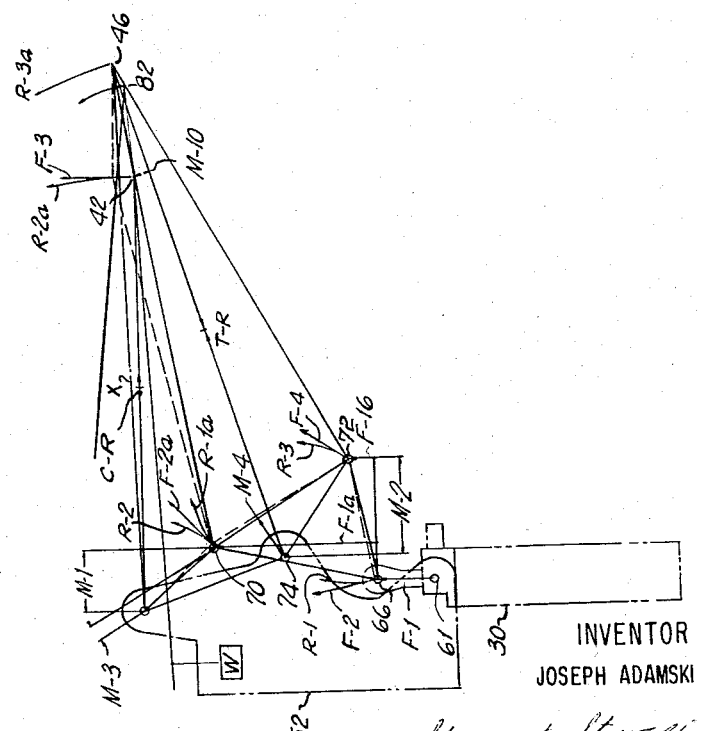

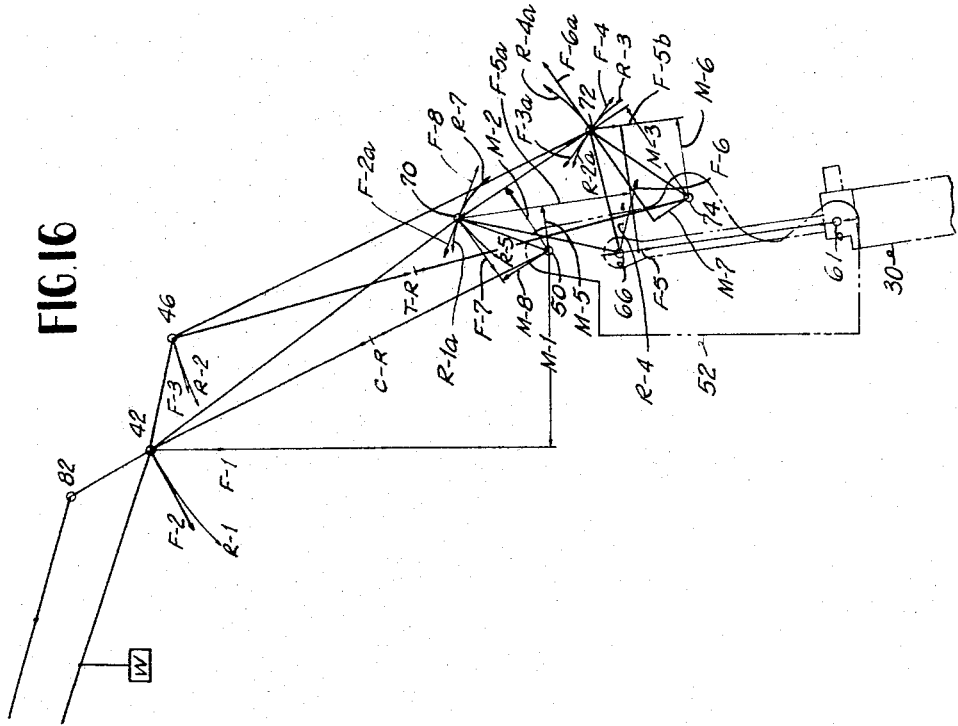
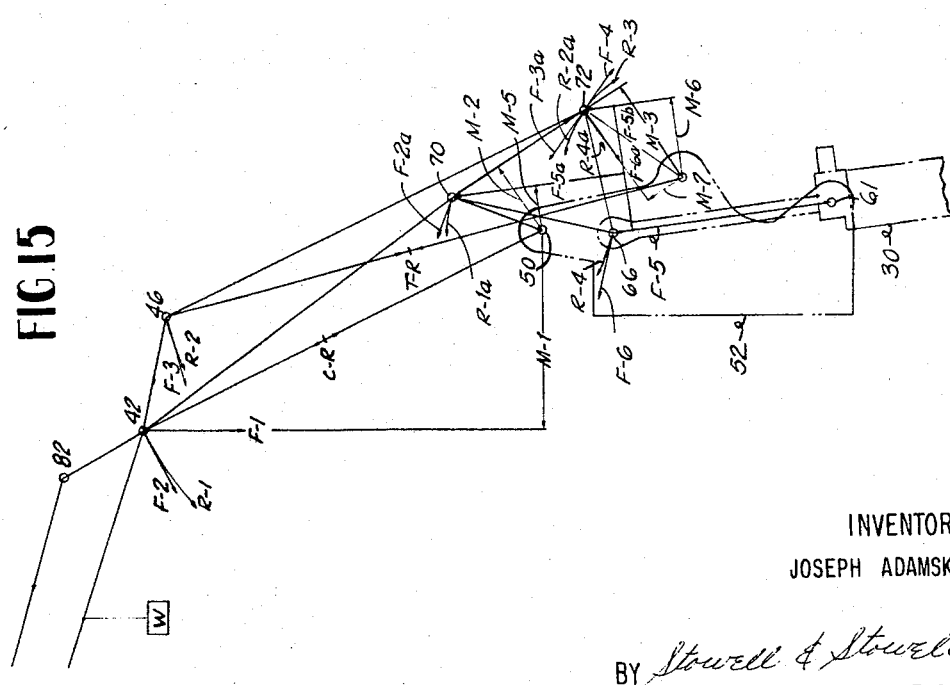

United States Patent Office 3,297,357
Patented Jan. 10, 1967

3,297,357
CONVERTIBLE TOP MECHANISM
Joseph Adamski, Brooklyn, Mich., assignor to Dura Corporation, Oak Park, Mich., a corporation of Michigan
Filed May 28, 1965, Ser. No. 459,712
6 Claims. (Cl. 296—117)

This invention relates to an improved folding top mechanism for vehicles.

It is the current practice in vehicle body design to lower the window or belt line of all vehicles including convertibles. As the belt line of vehicles is lowered, it is necessary to increase the degree of travel of the folding top mechanism from its open position to its fully folded position if the top, when folded, is to be recessed below the vehicle belt line.

It is an object of the present invention to provide a folding top mechanism which moves through an arc substantially greater than 90° wherein the swinging motion of a pivotally mounted linear actuator for the top is minimized during the folding and unfolding of the top mechanism.

A further object is to provide such a convertible top mechanism wherein the work load and the force delivered by a linear actuator is transmitted to the rear rail and the balance link elements of the folding top through multiple force movements which force movements are co-responsive and variable to thereby provide for the more efficient use of the applied power.

Another object is to provide a folding top mechanism wherein the rear rail and the center rail may be folded in closely stacked relationship and in so folding the pivot of the rear rail and the center rail may travel beyond a straight line taken from the lower pivot of the rear rail and the upper end of the balance rail to thereby form a lock-out reaction of the folding top mechanism against any radial motion of the rear rail to extend the top if power were applied directly to the control or balance rail or link.

A further object is to provide such an arrangement of members wherein during unfolding of the roof from the lock-out position the rear rail is pivoted upwardly prior to movement of the balance link or rail, thereby generating a responsive movement of the total mass of the front rail, the center rail and their associated linkage. This responsive movement results in a pattern of movement such that the center rail travels in an upward and rearwardly swinging arc to provide substantial clearance between the top members and the rear glass windows of the vehicle, thereby permitting the use of larger glass windows in the rear sides of convertible vehicles.

A further object of the present invention is to provide a folding top mechanism for a convertible vehicle wherein the cylinder attaching pivot of the power plate interconnecting the rear rail, the balance rail, and the linear actuator has substantially only rectilinear movement, rather than a true radial movement.

It is an object of this invention to provide a folding top structure for convertible top automotive vehicles which is relatively simple in construction, easy to assemble and may be installed as a preadjusted subassembly in a vehicle body.

Another object of this invention is to provide a folding top structure including actuator means and operative mechanism which may be more compactly arranged and disposed within a vehicle body to permit improvements in interior and exterior styling and greatest seating capacity within the vehicle.

These and other objects and advantages are in part provided by a folding top mechanism for vehicles comprising a pair of relatively spaced articulated side rails each including front, center and rear rail sections, a pivot plate connecting the adjacent ends of said front and center rail sections together and providing for relative pivotal movement therebetween, means pivotally connecting said center and rear rail sections together intermediate their respective ends, a balance link pivotally connected to the rear end of said center rail section, means pivotally connecting the lower ends of the rear rail section and the balance link in spaced relation to a support bracket, a power transfer plate, means pivotally connecting the power plate to the rear rail section rearwardly of the rear rail section's pivotal connection to the support bracket, means pivotally connecting the power plate to the balance link rearwardly of the pivotal connection of the balance link to the support bracket, means for transmitting motion to said power plate, said motion transmitting means including a linear actuator, means pivotally connecting one end of the linear actuator to the power plate forwardly of the pivotal connections between the power plate and the rear rail and the power plate and the balance rail during all positions of said folding top mechanism.

The invention will be more fully described and other objects and advantages will be apparent from the following detailed description of the invention when considered in light of the drawings, wherein:

FIG. 2 is a similar view of the convertible top shown by FIG. 1 with the top shown in an intermediate operative position;

FIG. 5 is a fragmentary partial sectional view on line 5—5 of FIG. 1;

FIG. 5A is an enlarged fragmentary sectional view of that portion of FIG. 5 included within the circle A;

FIG. 6 is an enlarged section along line 6—6 of FIG. 1;

FIG. 7 is an enlarged section on line 7—7 of FIG. 1;

FIG. 13 is a diagrammatic showing of the static, dynamic and the internal tensing forces on the primary members of a convertible top mechanism constructed in accordance with the teaching of the present invention;

FIG. 14 is a diagrammatic view similar to that shown in FIG. 13 with the top mechanism extended to a 2 o'clock position;

FIG. 15 is a diagrammatic view similar to that shown in FIG. 13 with the top mechanism in full extension over the windshield header;

FIG. 16 is a diagrammatic view similar to that shown in FIG. 13 with the top mechanism in full extension over the windshield header with the actuator in top retracting position;

Figure 1:
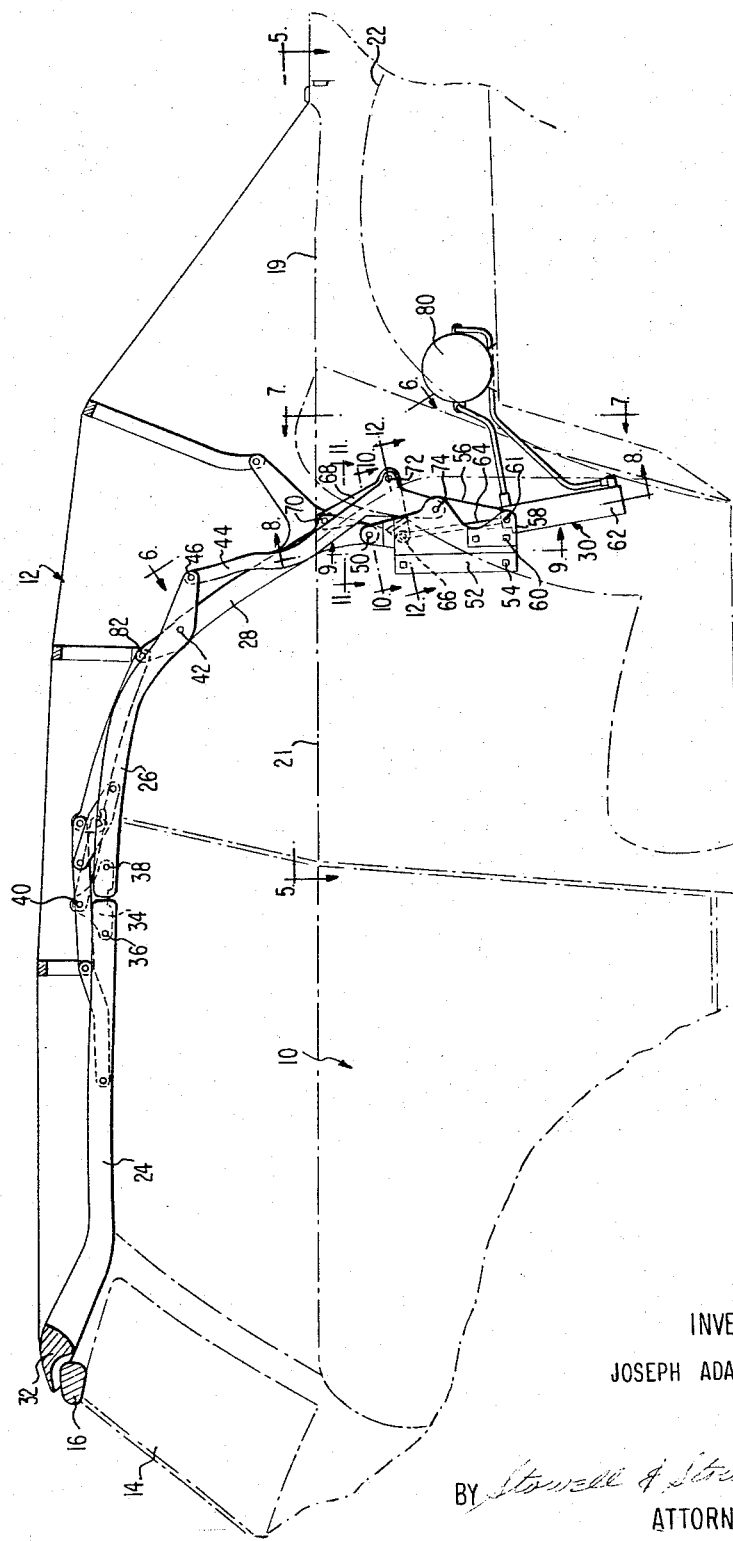
FIG. 1 is a vertical section through one side of the operating linkage of a convertible top shown in the erected or extended position with certain portions of vehicle body omitted and other portions shown in phantom.

Referring to the drawings in further detail, and FIG. 1 in particular, a vehicle body 10 is shown in phantom outline and is provided with a folding top 12 which is shown as erected and extended thereover.

The vehicle body 10 is shown sufficiently to identify the windshield 14 having a header bar 16 and a rear seat 18 behind which is provided the trunk area and space 19 receptive of the folding top 12 in its fully retracted and stored position. The vehicle belt line 21 and rear wheel housing 22 are also shown and identified for general reference purpose.

In the subsequent discussion of the folding top 12 and and the operative mechanism thereof, reference made to the "forward" or "rearward" disposition of any member, or the use of like terms, is to be understood as with regard to the position thereof with respect to the front or back ends of the vehicle 10 on which the top is provided.

The top structure 12 includes articulated side frame rails and interconnected cross-bows which form a framework over which a fabric cover is extended. The side frame rails are each made up of a front side frame rail section 24, a center side frame rail section 26 and a rear side frame rail section 28. The articulated side frame rails are symetrically opposite and are power operated by actuating means 30.

As will be appreciated, the actuating means 30 are interconnected for synchronous operation and are mounted on the vehicle body and obscured within suitable housings provided in the rear passenger compartment area.

The front side rail sections 24 have a top header 32 provided across their forward ends and formed for engagement within the windshield header bar 16. A pivot plate member 34 is connected to the rear end of the front side rail section 24 and to the forward end of the center rail section 26. The pivot plate is triangular in shape with spaced pivot connections 36 and 38 for engagement with the front and center side rail sections 24 and 26, respectively, and with a third pivotal connection 40 disposed apart therefrom for connection to an operating link in a matter described in my application S.N. 271,960 filed April 10, 1963 now Patent No. 3,180,675.

The center side rail section 26 is connected to the pivot plate 34, as mentioned, and includes a pivotal connection 42 near its rear end providing engagement with the rear side rail section 28. An operative or balance rail 44 is engaged to the rearmost end of the center side rail section 26 by means of the pivotal connection 46.

The rear side rail section 28 is pivotally connected to the center side rail section 26 at 42, as mentioned, and is formed to provide a generally downwardly disposed end 48 which is pivotally connected at 50 to a support structure 52.

The support structure 52 is generally U-shape in transverse cross section and fasteners 54 attach the support structure 52 to the inner surface of member 56 which comprises a weldment of the vehicle body structure. The U-shaped support 52 includes plate 58 which is attached to the support 52 by fasteners 60 and this extension forms a yoke and trunnion pivot support 61 for the hydraulic cylinder 62 which serves as the linear power actuator.

The power cylinder 62 may be much smaller than previous cylinders used for like purposes since the disclosed top makes better use of the power applied thereto. Further advantage is obtained in mounting the smaller cylinder on the support means 52 and having its trunnion supported at its upper end. Aside from enabling the cylinder to be positioned for a shorter and more productive work stroke, this avoids the floor or frame connection and makes the actuator part of the top assembly. This, in turn, enables preadjustment of the complete top assembly and subsequent installation as a unit in a vehicle body.

The piston rod 64 of cylinder 62 is pivotally connected to a power plate 68 as at 66.

The power plate 68 is generally triangular in side view and the plate is pivotally connected at 70 to the rear rail 28, at a point rearwardly of the pivotal connection between the rear rail section and the support member 52. This connection is offset from the pivotal connection 42 between the rear rail section 28 and center rail section 26 as more clearly shown in FIG. 6 of the drawings. The power plate 68 is also pivotally connected at 72 to the balance rail 44 and this connection is also offset as illustrated in FIG. 6. It will be particularly noted that pivotal connection 72, between the power plate and the balance or control rail, is also positioned rearwardly of the pivotal connection between the piston rod 64 and the power plate.

The lower end of the balance rail 44 is pivotally connected to the support plate 52, as at 74, in spaced relation to the connection of the rear frame side rail section 28 thereto.

The power cylinders 62 are activated by control means in the passenger compartment which are not specifically shown. Such control means place in operation a fluid pump and motor 80 operatively connected by fluid lines 82 to the power cylinder 62. The fluid cylinder 62 is of the double-acting type permitting the piston rod 64 to be controlled for either extension or retraction of the folding top.

Figure 8:
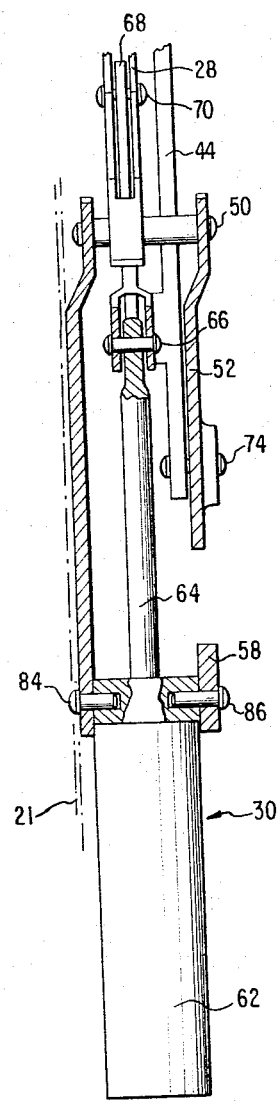
FIG. 8 is an enlarged sectional view substantially along line 8—8 of FIG. 1.
Figure 9:
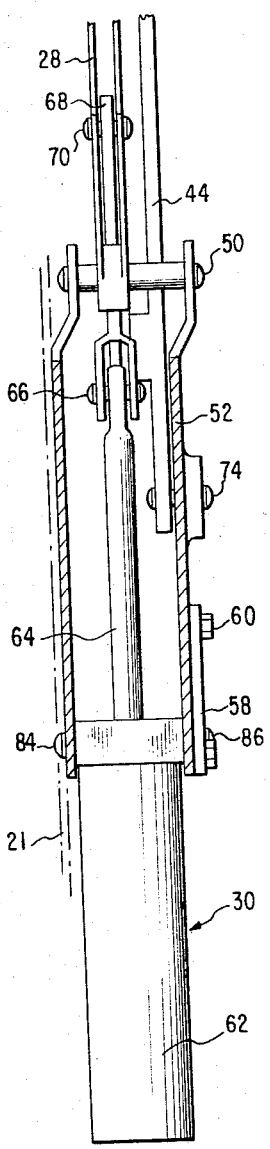
FIG. 9 is an enlarged sectional view along line 9—9 of FIG. 1.
Figure 10:
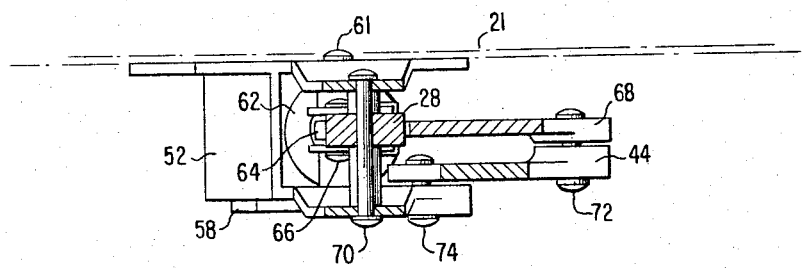
FIG. 10 is an enlarged sectional view along line 10—10 of FIG. 1.
Figure 12:
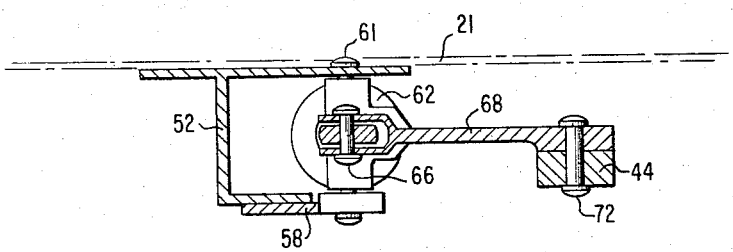
FIG. 12 is an enlarged section along line 12—12 of FIG. 1.
Figure 11:
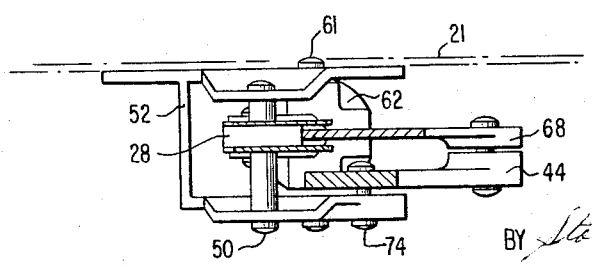
FIG. 11 is an enlarged section along line 11—11 of FIG. 1.

Referring now to particular parts of the folding top operating framework in greater detail:

The details of the support provided for the hydraulic cylinder 62 are best shown by FIGS. 8 and 9. The support 52 is formed to provide spaced yoke or trunnion arms receptive of pivot pin fasteners 84 and 86 providing a pivotal axis for the hydraulic cylinder 62. The mounting plate support 52 is formed to dispose the power cylinder 62 for free-swinging motion outside the support panel wall 21.

FIGS. 5, 5A, 10, 11 and 12 clearly illustrate the U-shaped bracket or support member and the pivotal connections between the bracket 52 and the rear and balance rails; the power cylinder and the bracket and the power cylinder piston rod and the power plate 68. These illustrations together with FIGS. 6, 7, 8 and 9 show the compact and overlapping nature of the lower and rearward members of the folding top which coact to provide the many advantages of the present invention.

Such advantages will become more apparent to those skilled in the art from the following description of the operation of the top mechanism with particular details provided during particularly novel portions of the folding and unfolding cycle of operation.

Figure 4:
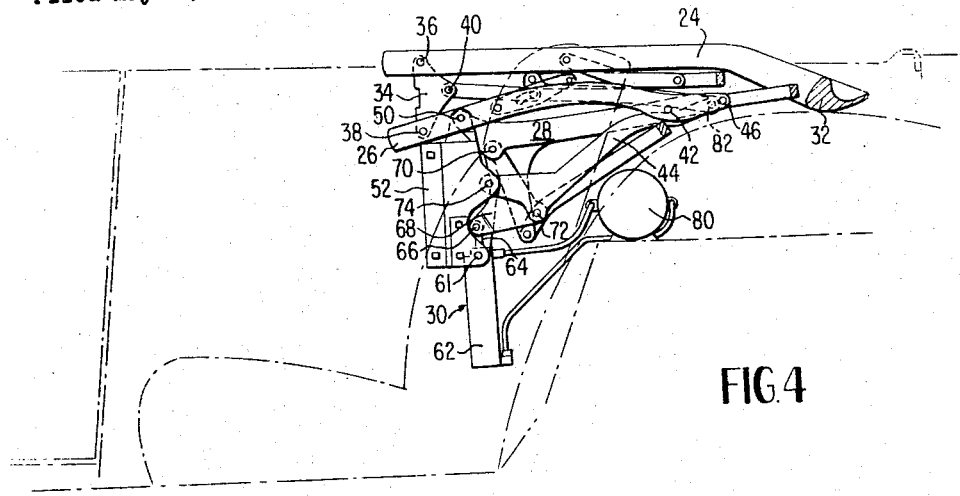
FIG. 4 is a similar view of the convertible top showing the same in a folded position.

Referring to the drawings, and in particular to FIG. 4, which shows the top in its fully retracted and stored position, it will be seen that the center rail section 26 is folded toward the rear rail section 28 to an extent that the most forwardly end thereof overlaps the rear rail section at the rear rail section's pivotal connection 50 of the U-shaped support member 52. In this position a straight line drawn from the pivotal connection 50 to the axis of pivotal connection 46 between the center rail section and the balance rail 44 shows that the pivot pin 42 has rotated below the line to thereby create a toggle or lock-out connection which resists any radial forces which would tend to urge the forward and center rail sections into their extended positions. This is particularly true if the force tending to extend said members is applied to the balance rail 44, which in some of the prior art folding top mechanisms, is initially responsible for lifting the forward and center rail sections from their folded positions.

Figure 3:
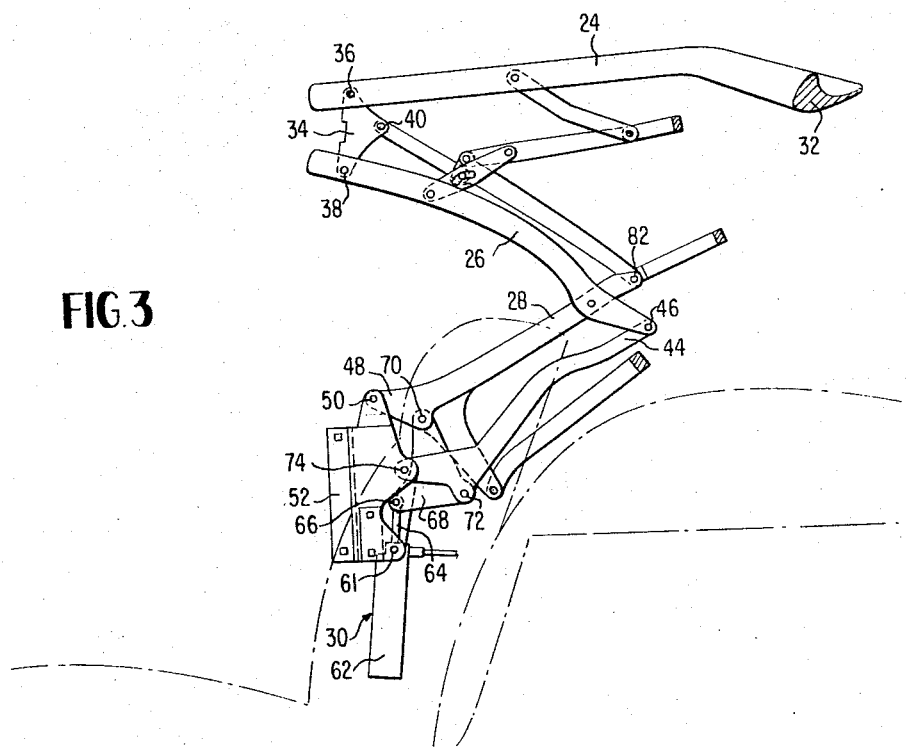
FIG. 3 is a view similar to that shown in FIGS. 1 and 2 with the top shown in a rearward position.

With the assembly of the present invention, in order to urge the top mechanism from its fully retracted position to an extended position, the rear rail section 28 must be radially moved about its pivot 50 to release pivotal connection 42 from its toggle lock-out position described above. Since the balance rail 44 is constrained from any radial motion by the same toggle lock-out system, application of power to the power plate 68, at point 66, causes the plate 68 to rotate about its pivotal connection 70 to the rear rail section 28, thereby substantially vertically extending the forward and center rail sections with substantially little movement of the rear rail section 28. This initial movement is illustrated in FIG. 3 of the drawings. It will also be noted that during the initial lift-out motion, pivot 72, between the power plate 68 and the balance rail 44, acts substantially as a fixed pivot with the power plate 68 rotating thereabout. After the pivot 42 is carried radially out of its toggle lock-out position and passes beyond the straight line position mentioned hereinabove, the balance rail or control link 44 commences to rotate radially about its pivot 74 on the U-shaped support member 52. Rotation of the balance rail 44 is in conjunction with rotation of the rear rail 28, as the two rails are interconnected by the power plate 68 and both are now free to move coresponsively to multiple force moments.

Following the extension of the folding top from the position shown in FIG. 3 to the position of FIG. 2 and finally to that illustrated in FIG. 1, it will be apparent that the force acting on the power plate 68 at point 66 is transmitted to pivot 72 and to pivot 70 (for all practical considerations of applied force moment) in the direction of a line of force from pivot 61 through pivot 66, the direction of applied force being variable throughout the full range of operation of the top mechanism substantially in a vertical direction rather than a true radial motion.

By virtue of geometric arrangement of the pivot points 70, 72 and 66 in relationship to the position of the pivot 61 connecting the cylinder 62 to the support member 52, the arc of swing of the cylinder 62 on its trunnion pivots is maintained at a minimum, even though the rear rail section 28 and the balance or control rail 44 rotate substantially beyond a 90° arc about their respective pivotal mountings.

A further important feature of the folding top mechanism comes into play when the top mechanism passes a point of counterbalance as illustrated in FIG. 2 of the drawings. Having passed this point, gravitational forces assist in extending the top onto the body to its fully extended position. Therefore, the mechanical advantage required of the power plate in respect to its connections to the rear rail and the balance rail is at a minimum at the time the power requirements are in part provided by gravitational forces.

The sequence of forces and motions hereinabove described reverses during retraction of the folding top mechanism, and during retraction, gravitational forces work in retracting the mechanism into the storage space after the top passes the center balance position illustrated in FIG. 2 of the drawings.

From the foregoing description of the operation of the invention it will be particularly noted that during the complete cycle of operation of the folding top mechanism, pivots 70 and 72 always remain rearwardly of a line passing through pivots 66 and 74 and that the primary motion of the power plate 68 is rectilinear.

The unique features of the present invention will be summarized with reference to FIGS. 13 through 18 which comprise a series of diagrammatic views showing the static, the dynamic and the tensing forces on the primary members of the convertible top mechanism at various stated positions of opening and retraction. Each of the diagrams will be separately discussed hereinbelow.

Referring particularly to FIG. 13 which illustrates the top structure in the fully retracted position with forces being applied to urge the top into extension the static forces at the moment of force application are as follows:

Pivots 50 and 42 of rear rail in conjunction with pivots 74 and 46 of the control link, wherein the pivots 50 and 74 are spaced by their mountings on the support bracket 52 and the pivots 42 and 46 are spaced by their mountings on the rear end of the center side rail component 26, form a trapezium 50–42–46–74.

The pivot 70 of the power plate 68, located in spaced relationship to the pivot 50 of the rear rail, in conjunction with the pivot 72 of the power plate, located in spaced relationship to pivot 74 of control link, form a trapezium 50–74–72–70 which is spaced in an offset manner from the trapezium 50–42–46–74 described above.

The rear rail, from its lower pivotal connection 50 with the support bracket, to its upper pivotal connection 42 with the center rail, resists a compressive force as shown by C–R (compression resistance).

The control link, from its lower pivotal connection 74 with the support bracket, to its upper pivotal connection 46 with the center rail resists a tensil force T–R (tensil resistance). A straight line $x$ from pivot 50 in the lower end of the rear rail, to the pivot 46, in the upper end of the control link, shows pivot 42, in the upper end of the rear rail, to be below the straight line $x$. The pivot 46 is urged below said straight line $x$ by pressure of weight W of the mass of the center rail, forward rail, header, top rail links and all trim components of the finished top attached thereto, such weight causing a counterclockwise rotation of pivot 42 about pivot 46 at the extreme rear end of the center rail. Since the rear rail between its upper and lower pivots is in compression and the control link is in tension, as previously mentioned, a rotational tendency R–1 is created with its accompanying force moment M–10. This rotational tendency R–1 is restrained by the aforementioned weight W pressing downward on pivot 42. Thus for practical consideration pivot 42 is restrained from rotation tendency R–1 by its toggle lock-out between pivots 50 and 46.

In the same situation the dynamic forces are as follows.

In order to achieve an arrangement whereby the top mechanism is folded to extreme compactness pivots 42–46–82 are so arranged as to align the component parts in the area of these pivots to overlap each other in silhouette. Such arrangement causes the pivot 42 to drop into its toggle lock-out position. With the lock-out of pivot 42 it is apparent that to apply an actuating force to the control link 44, to initiate rotary motion and erection of the top mechanism for purposes of extending it out of the storage position, would result in no response, since the center rail with its pivotal attachment 42 to the rear rail has a counter-clockwise limitation under these conditions. Therefore, in essence pivots 50–74–46 form a triangle of which pivots 50 and 74 are attached to the support bracket. Such a triangular arrangement cannot be moved radially if it is locked firmly at any of its corners, as in this instance by the pivot 42 being positioned below line $x$. Therefore to urge the entire mechanism for extension and to continue such movement, the pivot 42 must first be raised radially above line $x$ to release the rear rail and the control link from its triangular lockout position described above. For this purpose power plate 68 is mounted at pivot 72 to the control link. This pivot 72 is in essence a fixed point of reaction at this position of the top mechanism. The power plate is also attached at pivot 70 to the rear rail and the lineal force actuator 30 is mounted at pivot 61 to the support bracket in spaced relationship to the pivots 74 and 50. The lineal movable extension 64 of the actuator is attached pivotally to the power plate at pivot 66.

To proceed now with the description of the dynamic forces, force F–1 imparted from the lineal actuator reacts on pivot 61 which is in spaced and fixed relationship to pivots 50 and 74; the support bracket 52 being a common mounting for these three pivots. Force F–1 reacts through pivot plate 68 as force F–1$a$ at pivot 70 and as force F–1$b$ at pivot 72. Since, in essence, pivot 72 is a fixed point of reaction at this stage of the extending operation of the top mechanism, pivot 66 is urged to rotational tendency R–1 along with rotational tendency R–1a at pivot 70, such rotation generating about pivot 72. Rotational tendency R–1 transmits force F–2 through the power plate to pivot 70 creating force F–2a at this point which in turn urges pivot 70 to rotational tendency R–2 about pivot 50 at the lower end of the rear rail. Force F–2a urges pivot 42, into rotational tendency R–2a creating force F–3 about pivot 50 and thereby the continuity of motion of the lineal actuator at pivot 66 on the power plate proceeds to lift pivot 42 above the line $x$, consequently releasing the locked-out condition of the previously described triangle formed by pivots 50–74–46. Release of pivot 42 from its lockout position permits force F–1a at moment M–1 to drive pivot 70 radially about 50 (R–2) along with the pivot 42 (R–2a). Also force F–1b at moment M–2 drives pivot 72 radially about pivot 74 (R–3) along with pivot 46 (R–3a). Pivots 42 and 46 move cooperatively by their common connection to the power plate through pivots 70 and 72.

In the same situation the tensing forces are as follows.

Pivots 50 and 42 and pivots 74 and 46 when connected by straight lines form a trapezium, which continuously varies in the range of the radial travel of the rear rail and the control link on their lower pivots 50 and 74 respectively. For purposes of driving radially the rear rail and the control link jointly and cooperatively each is connected to the power plate at pivotal connections 70 and 72 respectively. Since pivots 50 and 74 in conjunction with pivots 42 and 46 form a trapezium and pivots 50 and 74 in conjunction with pivots 70 and 72 form another trapezium and since a line from pivot 50 to pivot 74 is a common side to both trapeziums and since both of the trapeziums must rotate jointly and cooperatively, it becomes apparent that a geometric impossibility exists and in theoretical fact it does. The theoretical geometric impossibility is utilized to improve the operation of the top mechanism as described below.

The disposition of pivot 70 in the rear rail, relative to pivot 50 about which it has its arc of radial travel (R–2) along with the disposition of pivot 72 in the control link relative to pivot 74 about which it has its arc of radial travel (R–3) is such by design choice, that when the rear rail and the control link rotate about their pivots 50 and 74 and thereby vary the two aforementioned trapeziums, the distance from pivot 70 to pivot 72 varies from being either too long or too short.

In the physical components of the top mechanism the distance from pivot 70 to pivot 72 in the power plate component, is greater than the distance between pivot 70, in the rear rail, and pivot 72, in the control link. Insertion of the greater distance into the confines of the shorter distance is achieved by springing the control link and the rear rail components. The spring-like deflection in the rear rail is created by the separating force of the pivot plate acting at force moment M–3 about pivot 50. Likewise, the deflection in the control link is created by the separating force of the pivot plate acting at force moment M4 about pivot 74. Since pivot 70 and pivot 72 tend to separate from each other in opposite rotational directions, pivot 42 is also urged rotationally in the opposite direction of pivot 46 thereby causing pivot 42 to be urged to a clockwise rotation about pivot 46, thus creating a lifting or unfolding effect of the center rail along with its related structures. The internal tensing of the top mechanism, although insufficient in its own potential to commence the unfolding of the top mechanism, needs a minimum of additional force from the lineal actuator at pivot 66 to initiate the motion of the top mechanism. Thus we have a geometric error of the force geometry employed to produce an operational advantage in the function of the present convertible top mechanism. Further, the internal tensing of the linkage mechanism produces a rigidity of the assembled components which contributes to the quieter operation of a motor vehicle in which it is installed.

Referring now to FIG. 14 a force and rotation diagram is displayed at a 2 o'clock position of the top mechanism during extending of the folding top mechanism. Since trapezium 50–42–46–74 is constantly varying during operation of the top mechanism, such forces as are tending to create movement R–1 of pivot 66 and movement R–1a of pivot 70 about pivot 72 are contradictory to and at the same time contradicted by forces which tend to rotate pivots 66 and 72 about pivot 70. Therefore, the arrangement of pivot 66 in offset and fixed relationship to pivots 70 and 72 has no appreciable driving merit except that as seen in the display of line P denoting the pattern of travel of pivot 66 throughout the entire operational range of the top mechanism. Thus the swing arc of actuator 30 on its pivotal mounting 61 is minimized appreciably. In the range of travel of the top mechanism illustrated in this figure, force F–2a at moment M–1 and force F–1b at moment M–2 drive pivot 70 and pivot 72 radially about pivot 50 and pivot 74 respectively, such radial drive being done jointly and cooperatively by virtue of the fixed relationship of pivots 70 and 72 in the power plate 68.

Referring to FIG. 15 illustrating the top structure in full extension, the static forces with the lineal actuator applying pressure to extend the top are as follows.

Weight W of the mass of the center rail, forward rail header, top rail links and all trim components of the finished top attached thereto, causes a downward force F–1 on pivot 42 at force moment M–1 about pivot 50 resulting in rotational tendency R–1 of pivot 42. Pivot 42, being in fixed relationship to pivot 46 by attachment of both these pivots to the rear end of the center rail component of the top mechanism, urges pivot 46 to rotation R–2 about pivot 74. In this figure trapezium 50–42–46–74 is shown in the extreme variable from that shown in FIG. 13. It is apparent from the disposition of this trapezium 50–42–46–74, in relation to its fixed pivots 50 and 74 on support bracket 52, that the weight W effects in the rear rail component a compression resistance C–R and in the control link component a tensil resistance T–R. Therefore, except for the amount of C–R and T–R, the action remains identical throughout the entire range of operation of the top mechanism. Rotational tendency R–1 with its accompanying force F–2 results in rotational tendency R–1a and force F–2a at pivot 70 about pivot 50 and likewise rotational tendency R–2 with its accompanying force F–3 results in rotational tendency R–2a and force F–3a at pivot 72 about pivot 74. Trapezium 50–70–82–74 is also seen here in its variable extreme from that seen in FIG. 13.

In the same situation the tensing forces are as follows.

Referring back to the disclosure relative to FIG. 13 "Internal Tensing Forces," the entire disclosure is applicable to the instance for FIG. 15. The spacing of pivot 70 from pivot 72 is fixed in the power plate at a greater distance than is the resultant between the two respective pivots 50 and 74 in the rear side rail and the control link. With the greater distance of the power plate inserted between pivots 70 and 72, of the rear rail and control link, a spreading force at force moment M–2 urges pivot 70 to additional force F–2a with rotational tendency R–1a. In reaction the spreading force at force moment M–3 urges pivot 72 to rotational tendency R–3 with its accompanying force F–4. This spreading is in opposition to rotational tendency R–2a with force F–3a. The internal tensing of the rear rail, in a counterclockwise rotation and the control link in a clockwise rotation, creates a resultant of internal forces in the related and cooperative components of the top mechanism in this area which are favorable to the retraction of the entire top off of the body windshield header. The amount of such force tendencies in itself, however, is insufficient to initiate the movement.

The dynamic forces in the structures illustrated in FIG. 15 are such that with the application of lineal force F–5 at pivot 66, from the extension of actuator 70, a force F–5a is applied to pivot 70 at force moment M–5, such action being additive to force F–2a with a rotational tendency R–1a. Also force F–5b is applied to pivot 72 at force moment M–6, such action being additive to force F–3a with rotational tendency R–1a. Force F–5 at pivot 66 also creates force F–C with rotational tendency R–4 resulting in pivot 72 being subjected to a R–4a rotational tendency with force F–6a at force moment M–7 thus force F–3a is assisted in rotation tendency R–2a.

From the arrangement of the force geometry as displayed in FIG. 15, the favorable resultant of force tendency are sufficient to create a substantial pressure of the folding top header onto the body windshield header. Such condition is desirable and conducive to securing the latching mechanisms between the folding top and the car body.

Referring to FIG. 16, which, like FIG. 15, shows the top structure in the fully extended position, the static forces and the internal tensing forces are the same as those described with reference to FIG. 15; however, since the actuator is urging the top structure into its retracted position, the dynamic forces differ from those described in reference to FIG. 15. The illustrated dynamic forces may be described as follows:

Taking into account the force F–5 onto pivot 66, which is generated by retraction of actuator 30 on its fixed pivotal mounting 61, pivot 66 reacting around pivot 70 produces the rotational tendency R–4 with its force F–6. The force F–6 urges pivot 72 to rotational tendency R–2a with force F–6a at moment M–7 thus adding to force F–3a along rotational tendency R–2a. Simultaneously pivot 70 reacts to a rotational tendency R–5 with force F–7 about pivot 72. The force F–7 at moment M–8 is additive to force F–2a along rotational tendency R–1a.

Force F–5, acting on pivot 66, also reacts as force F–5a on pivot 70 at moment M–5 along with force F–5b on pivot 72 at moment M–6. Thus force F–5 in part produces a rotational counter force on pivots 70 and 72 about pivots 50 and 74 respectively. The counter force is directionally adverse to retraction of the top mechanism. The accumulative value of force F–5a at moment M–5 on pivot 70 and force F–5b at moment M–6 on pivot 72 is sufficient to overcome the additive resistance to retraction offered by the total of forces F–2, F–2a, F–3 and F–3a, so by the continued contraction of actuator 30 the top mechanism will proceed towards full retraction with a considerably less lifting ability off the windshield header as compared to the pressing force onto the windshield header as discussed with reference to FIG. 15. This is a desirable feature to prevent undue twisting of the top frame in event when the latching hook may not release on either side—the actuator is taxed to a stall condition.

Figure 17:
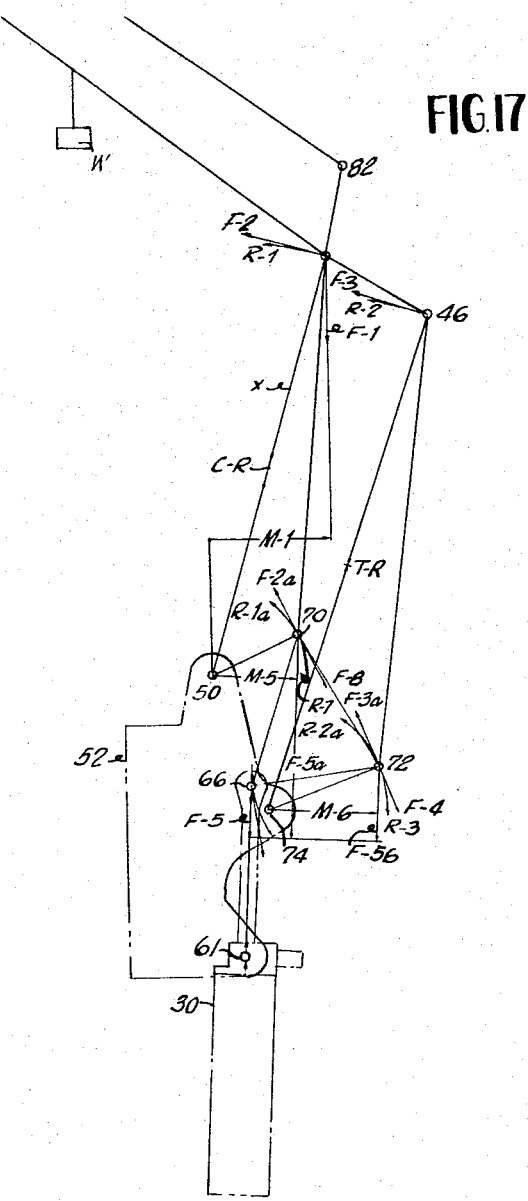
FIG. 17 is a diagrammatic view similar to that shown in FIG. 13 with the top mechanism retracted to the 11 o'clock position, substantially the gravitational counter balance point of the top.

Referring to FIG. 17, illustrating the top structure at the gravitational counter balance of the top, the static forces are identical to those described with reference to FIG. 16 with the exception that the force moment M–1 is on the opposite side of the pivot 50.

The dynamic forces applicable to FIG. 17 are the same as those described with reference to FIG. 14, therefore, as is apparent in FIG. 17 force F–5a at moment M–5 creates rotational tendency R–7, with force F–8 at pivot 70, thereby resisting and overcoming rotational tendency R–1 with force F–2 at pivot 42. Cooperatively force F–5b, at moment M–6 creates rotational tendency R–3 with force F–4, at pivot 72 thereby resisting and overcoming rotational tendency R–2 with force F–3 at pivot 46. With clockwise rotation of pivot 42 about point 50 and pivot 46 about point 74 the top mechanism proceeds to retract to a point of gravitational counter balance on its pivots 50 and 74.

Further, taking FIG. 14 and its consideration and appraisal for the extending action of the top, all force and rotational tendencies will be identical except that the lineal actuator 30 will check the gravitational fall of the top during its extension action rather than overcome such gravitational fall by its contractual action.

Figure 18:
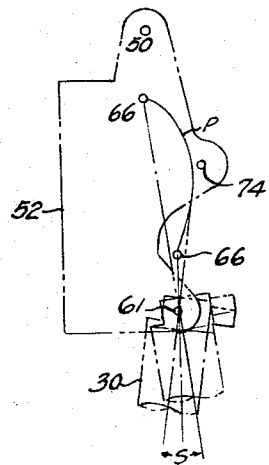
FIG. 18 is a diagrammatic display of the path of travel of P of pivot 66 along a particular arc.

FIG. 18 illustrates the path of travel P of pivot 66 along with the minimized arc of swing S of actuator 30 on its pivotal mounting 61. The extremes of the line P are shown at the full retract position of the top mechanism as in FIG. 13 and the fully extended position as in FIGS. 15 and 16.

The invention has been described wherein the linear power actuator comprises a trunnion mounted cylinder and piston assembly. Other forms of linear actuators may be readily substituted for the piston and cylinder unit such as the lead-screw assembly shown in FIGS. 18, 19 and 20, in my application Serial No. 271,960, filed April 10, 1963, for "Convertible Top Mechanism."

Further, although certain specific embodiments of this invention have been shown and described in detail, it will be appreciated that other innovations, modifications and variations are within the scope of the teachings set forth. Accordingly, such of these innovations, modifications and variations as are within the spirit of the invention as herein set forth, are not specifically excluded by the language of the hereinafter appended claims, are to be considered as inclusive thereunder.

I claim:

1. A folding top mechanism for vehicles, comprising: a pair of relatively spaced articulated side rails each including front, center and rear rail sections, a pivot plate connecting the adjacent ends of said front and center rail sections together and providing for relative pivotal movement therebetween, means pivotally connecting said center and rear rail sections together intermediate their respective ends, a balance link pivotally connected to the rear end of said center rail section, means pivotally connecting the lower ends of the rear rail section and the balance link in spaced relation to a supporting unit therefor, a power transfer plate, means pivotally connecting the power plate to the rear rail section rearwardly of the rear rail section's pivotal connection to the support unit, means pivotally connecting the power plate to the balance link rearwardly of the pivotal connection of the balance link to the support unit, means for transmitting force and motion to said power plate, said force and motion transmitting means including a power actuator, means pivotally connecting one end of the power actuator to the power plate forwardly of the pivotal connections of said power plate to the rear rail and to the balance rail during all operational positions of said folding top mechanism.

2. The invention defined in claim 1 wherein movement of the power plate during movement of the folding top mechanism from the top open to the top folded positions is substantially rectilinear.

3. The top mechanism defined in claim 1 wherein the pivotal connection between the pivot plate and the center rail section lies below a line through the pivotal connection between the real rail section and the support unit and the pivotal connection of the center rail with the top portion of the control link when the top mechanism is fully folded to thereby provide a toggle lock-out of the pivotal connection between the center and rear rail sections.

4. The invention defined in claim 1 wherein the pivotal locations within the power plate are substantially in the shape of a scalene triangle and such pivotal connections between the power plate and the rear rail section, the balance rail and the power actuator are positioned at apexes of the said scalene triangle.

5. The invention defined in claim 1 wherein the power actuator comprises a hydraulic piston and cylinder unit and the cylinder is pivotally mounted at its upper end to a vehicle mounted support bracket.

6. The invention defined in claim 5 wherein the rear rail section and the balance rail are pivotally mounted to said support bracket at their lower ends and wherein the rear rail section and the balance rail are pivotally connected at their upper ends to the rearward portion of the center rail and wherein a power transfer plate is pivotally attached at two of its three pivotal connections to said rear rail and balance rail intermediate the said lower pivotal mountings of said rails and the said pivotal connection at the upper ends.

References Cited by the Examiner

UNITED STATES PATENTS

| | | | |
|---|---|---|---|
| 3,180,675 | 4/1965 | Adamski | 296—117 |
| 3,251,625 | 5/1966 | Adamski | 296—117 |

BENJAMIN HERSH, *Primary Examiner.*

C. C. PARSONS, *Assistant Examiner.*